United States Patent [19]
Seitzer

[11] 3,979,505
[45] Sept. 7, 1976

[54] METHOD FOR MAKING HYDROGEN
[75] Inventor: Walter H. Seitzer, West Chester, Pa.
[73] Assignee: Sun Ventures, Inc., St. Davids, Pa.
[22] Filed: Sept. 3, 1974
[21] Appl. No.: 502,476

[52] U.S. Cl.............................. 423/657; 423/648; 423/618
[51] Int. Cl.² ....................... C01B 1/02; C01B 1/08
[58] Field of Search.................... 423/657, 648, 618

[56] References Cited
UNITED STATES PATENTS

| | | | |
|---|---|---|---|
| 3,017,250 | 1/1962 | Watkins | 423/657 |
| 3,761,352 | 9/1973 | Souriau | 423/657 X |
| 3,803,025 | 4/1974 | Dailey | 423/648 X |
| 3,821,362 | 6/1974 | Spacil | 423/657 |

*Primary Examiner*—Edward Stern
*Attorney, Agent, or Firm*—J. Edward Hess; Donald R. Johnson; Paul Lipsitz

[57] ABSTRACT

A process for manufacturing hydrogen by reducing tin oxide in a reducing zone at about 1000° to about 1200°C. with a reducing gas to form molten tin, feeding the molten tin as a spray into an oxidizer zone containing steam maintained at about 400° to about 650°C. and at about 1000 to about 2500 psig, whereby the reaction of the tin with the steam forms hydrogen and tin oxide, separating hydrogen product under pressure and recycling the tin oxide to the reducing zone.

5 Claims, 1 Drawing Figure

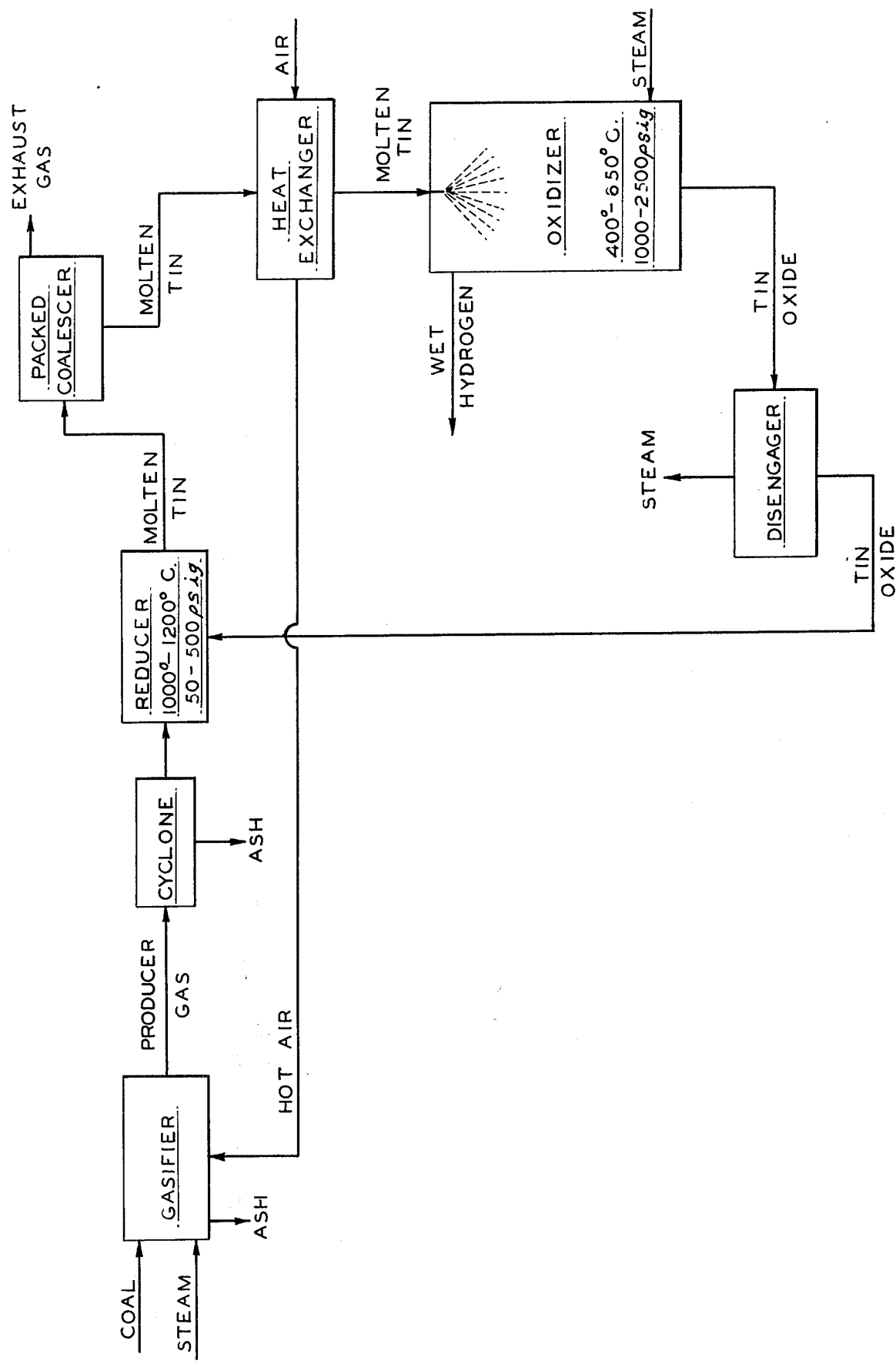

METHOD FOR MAKING HYDROGEN

The production of hydrogen by reaction of steam with a metal is well known. Most commonly, steam is reacted with iron in order to obtain hydrogen, but it is known in the art that iron may be replaced with other metals. Thus, for example, U.S. Pat. Nos. 3,017,250 and 2,635,947 discloses a process in which particles of various metals including iron, lead, tin, zinc, and others are reacted in a fluidized bed technique with steam to generate hydrogen, and the oxidized metals regenerated and recycled for further reaction. In dealing with particulate matter, however, several difficulties arise in the oxidizer zone where the reaction between metal and steam occurs. First of all, heat transfer between particulate solids is difficult to achieve. Secondly, the particulate matter is attritted and must be replaced. Also, the hydrogen product which is generated will be removed from the system under moderate pressure, if any, whereas it would be most desirable to obtain the hydrogen under high pressure conditions so that subsequent compression of the product hydrogen for storage is not required.

It has now been discovered in accord with this invention that hydrogen may be prepared by reduction of a metal with steam under pressure and that the hydrogen product need not be subjected to significant further compression for storage. This advantage and other advantages of subject process are obtained by using molten tin as the metal to be reacted with steam and in accord with the invention, hydrogen is manufactured by reducing tin oxide in a reducing zone at about 1100°C with a reducing gas to form molten tin, pumping said molten tin through a spray nozzle into an oxidizer zone containing steam maintained at about 500°C and at about 2500 psig, whereby the reaction of said molten tin with said steam forms hydrogen and tin oxide, separating said hydrogen product under pressure and recycling said tin oxide to said reducing zone. In a preferred technique, the reducing gas will be producer gas obtained by gasifying coal.

In addition to the preparation of hydrogen under pressure, the invention offers further advantages which are:

1. higher utilization of producer gas during reduction thereby reducing the size of the producer and the amount of coal required,
2. complete conversion of the tin oxide to molten metal so that no deactivation of the oxide occurs. Such deactivation is a disadvantage in the iron oxide system where deactivated material must be replaced periodically with fresh ore,
3. ease of cooling and handling molten tin as compared to cooling either the producer gas or iron oxide particulates, and
4. absence of carbide formation by the tin thereby eliminating methane as a significant impurity in the product hydrogen.

In order to more fully understand the invention, reference is now made to the drawing which exemplifies the preferred technique. Coal and steam enter a gasifier at a temperature of about 500°C. and at about 50 to 500 psig. together with hot air and producer gas is generated in accord with known prior art methods. The gas is passed to a separator such as a cyclone to remove any solids which might be present in the gaseous stream and the stream is then taken to the reducer section. Here, tin oxide is reduced by means of the producer gas to tin metal under conditions of the reaction which will be at a temperature of about 1000° to about 1200°C. and at a pressure of from about 50 to about 500 psig, preferably 150–250 psig. At these temperatures the tin oxide is reduced to molten tin. This temperature range is significant because at lower temperatures the thermal input is inadequate for efficient reaction while at much higher temperatures the tin metal will be vaporized and subject to loss. The tin formed in the reaction is taken to a packed coalescer also maintained at about 1000° to about 1200°C. where the fine particles of liquid tin are coalesced into larger particles and exit from the coalescer as liquid tin. The coalescer will consist of a container having beads, stones, or other materials to provide a surface for coalescing the tin and it will be understood that this coalescer may be fabricated as part of the reducer. Any vaporous products will exit from the coalescer as gases and are subsequently handled by conventional methods. The liquid molten tin is pumped through a heat exchanger, if desired, and then fed to the oxidizer section. Since the tin is in liquid form it is readily pumped and will be fed through a nozzle so as to enter the oxidizer as a very fine spray, preferably in the form of a very fine mist. Furthermore, the tin will be maintained in the oxidizer under pressure, preferably, a pressure of at least about 1000 psig. and up to about 2500 psig. The temperature in the oxidizer will be at about 400°C to about 650°C. The oxidizer will also receive a source of steam which reacts with the molten tin to form tin oxide and hydrogen. The hydrogen product is taken from the oxidizer under pressure and is easily dried and then readily taken to storage tanks without any further compression being required. The tin oxide formed in the reaction is taken to a disengager (a cyclone) which separates the solid oxide from the steam and the solid oxide is returned to the reducer for recycling. As indicated, it is significant in the process of the invention that both the tin and steam are maintained in the oxidizer under pressure and thus the hydrogen product is also under pressure as formed. For this reason, the cost of the pressured hydrogen product is vastly lower than compressing it after it is made as is done in prior art hydrogen generation methods.

It is of interest to compare the utilization of producer gas in the conventional steam iron process with that of the process of the invention. The following table indicates that comparison with reducer gas made from Wyodak coal and indicates the higher efficiency of the steam tin process.

TABLE 1

| UTILIZATION OF PRODUCER GAS | | | |
|---|---|---|---|
| | | Exhaust Gases | |
| | | Steam-Iron | Steam-Tin |
| | Initial | (800°C) | 1000°C 1100°C |
| CO | 27.9 | 10.0 | 7.1 6.8 |
| $CO_2$ | 4.2 | 22.0 | 25.0 25.3 |
| $H_2$ | 19.5 | 8.2 | 4.0 2.6 |
| $N_2$ | 41.2 | 41.2 | 41.2 41.2 |
| $H_2O$ | 7.2 | 18.4 | 22.6 24.0 |
| BTU/SCF | 161 | 57 | 38 32 |
| Percent Utilized | | 65 | 76 80 |
| Producer Size | | 1 | 0.86 0.81 |

As can be seen, the utilization of the producer gas in the process of this invention is significantly higher than that of the steam-iron process, and accordingly, as indicated in the table, the size of the producer may be significantly reduced and still achieve a high efficiency process.

In order to further illustrate the invention, the following example is given.

EXAMPLE

Producer gas is obtained by feeding at an hourly rate 100 pounds of dry Wyodak coal, 3250 standard cubic feed (SCF) of air and 43.6 pounds of water as steam to a gasifier. The product of 6230 SCF/hr. of producer gas is separated from the 6.3 pounds of ash formed per hour by a cyclone and the gas fed to a reducer operated at 1100°C and 200 psig and containing 500 pounds of tin oxide ($SnO_2$). The 6230 SCF/hr. of gas obtained through a stone packed coalescer from which the gas is separated and the tin gathers to form a molten body of the metal. The molten tin is passed through a heat exchanger where its temperature is lowered to about 500°C. and it is then sprayed as a fine mist into an oxidizer unit held at 500°C. and 1500 psig which is also fed with 400 pounds/hr. of water as steam. The tin is converted to about 500 pounds/hr. of tin oxide and 2360 SCF/hr. of wet hydrogen is obtained as product which is removed from the oxidizer unit. The mixture of tin oxide and steam is then taken to a disengager where steam is separated and the tin oxide is recycled to the reducer section of the process.

The invention claimed is:

1. A process for manufacturing hydrogen which comprises reducing $SnO_2$ in a reducing zone at about 1000° to about 1200°C. with a reducing gas to form molten tin, feeding the molten tin as a spray into an oxidizer zone containing steam maintained at about 400° to about 650°C. and at a about 1000 to about 2500 psig, whereby the reaction of the tin with the steam forms hydrogen and tin oxide, separating hydrogen product under pressure and recycling the tin oxide to the reducing zone.

2. The process of claim 1 wherein the reducing gas is producer gas.

3. A process for manufacturing hydrogen which comprises reducing $SnO_2$ in a reducing zone at about 1000° to about 1200°C. with a reducing gas to form molten tin, coalescing said tin by passing it over a coalescing surface, feeding the molten tin as a spray as a unit into an oxidizer zone containing steam maintained at about 400° to about 650°C. and at about 1000 to about 2500 psig, whereby the reaction of the tin with the steam forms hydrogen and tin oxide, separating hydrogen product under pressure and recycling the tin oxide to the reducing zone.

4. The process of claim 3 where the reducing gas is producer gas.

5. The process of claim 4 where the tin oxide is reduced at about 1100°C. and about 200 psig. and the tin is oxidized at about 500°C. and about 1500 psig.

* * * * *